United States Patent

Frost

[11] Patent Number: 5,939,803
[45] Date of Patent: Aug. 17, 1999

[54] SYSTEM FOR OFF-MAINS SWITCHING OF CURRENT CONSUMING DEVICES SUCH AS ACTUATORS

[75] Inventor: John Frost, Sønderberg, Denmark

[73] Assignee: Linak A/S, Nordberg, Denmark

[21] Appl. No.: 08/696,868

[22] PCT Filed: Feb. 28, 1995

[86] PCT No.: PCT/DK95/00091

§ 371 Date: Aug. 21, 1996

§ 102(e) Date: Aug. 21, 1996

[87] PCT Pub. No.: WO95/23450

PCT Pub. Date: Aug. 31, 1995

[30] Foreign Application Priority Data

Feb. 28, 1994 [DK] Denmark .................................. 0237/94

[51] Int. Cl.$^6$ .................................................. H01H 35/00
[52] U.S. Cl. ............................ 307/126; 307/29; 307/30; 307/38
[58] Field of Search .................................. 307/29, 30, 38, 307/125, 126; 320/2; 364/492, 707, 273, 273.5

[56] References Cited

U.S. PATENT DOCUMENTS

| | | | |
|---|---|---|---|
| 3,740,636 | 6/1973 | Hogrefe et al. ............................. | 320/2 |
| 4,659,941 | 4/1987 | Quiros et al. ............................. | 307/11 |
| 5,483,464 | 1/1996 | Song ....................................... | 364/492 |
| 5,528,449 | 6/1996 | Koch ....................................... | 361/160 |
| 5,565,714 | 10/1996 | Cunningham ........................... | 307/125 |

*Primary Examiner*—Ronald W. Leja
*Assistant Examiner*—Albert W. Paladini
*Attorney, Agent, or Firm*—Watson Cole Grindle Watson P.L.L.C.

[57] ABSTRACT

An off mains switching system automatically switches off the mains current to current consuming units and reestablishes operational voltage thereto in response to switching on of such units. A control circuit actuates a voltage coupler in response to a unit becoming switched on and interrupts the voltage supply as a result of a detected termination of noticeable current consumption by such unit. The control circuit includes an operation capacitor with a relatively high capacity to which a charging voltage is supplied as long as the mains are connected. The operating capacitor operates as a voltage source for actuation of a control system in response to restarting of the unit. The control circuit further includes means for internally enabling a connection with the mains for maintaining a voltage supply for the control circuit when the charge on the capacitor drops below a critical level.

8 Claims, 3 Drawing Sheets

SYSTEM FOR OFF-MAINS SWITCHING OF CURRENT CONSUMING DEVICES SUCH AS ACTUATORS

BACKGROUND OF THE INVENTION

The present invention relates to an off-mains switching system for automatically switching off the main voltage to current consuming devices such as actuators in response to these being switched off.

In different installations, e.g. in connection with an actuator equipment on adjustable hospital beds, it is, for reasons of security, desirable that the main voltage to the equipment be kept interrupted whenever there is no actual need for it. Such an interruption or off-mains switching may be desirable also for other reasons, e.g. for avoiding electrical fields in bedrooms or for saving energy consumption in devices with idling losses, for example transformers. A superior interruption could be arranged by means of a manually operated main switch for the single equipment or section of installation, but of course it is to be preferred that the off-mains switching can happen automatically as a function of an operational switching off of the unit, without any need of remembering to then also operate a main switch. Correspondingly, a detector should be able to react on a new attempt to switch on the unit, such that the current supply can be reestablished as the need arises, without a main switch first having to be operated.

At the principal level it is the latter function which is the more problematic, because an earlier interruption of the voltage supply will imply that even the said detector is without supply. It is already known, however, that this problem can be dealt with by the use of a battery in the detector unit, see e.g. DE-A-2624316 and WO 93/11593, such that the voltage available for the detection of a desired restart of the operative unit will be in an acceptable low voltage range.

It is even known that the said battery can be backed up by a condenser voltage, which is maintained as long as the operative unit is subjected to the mains, and which may remain operative through a relatively long time after the last switching off of the unit, when a condenser with a high discharge resistance is used.

On this background it could be possible to avoid the battery, viz. if the equipment is operated daily or even just once a week, as a sufficient condenser voltage may well be maintained through some weeks after each charging. If the equipment is not used for longer time, a renewed start can be arranged by way of current supply from an external, mobile battery, or by actuating the equipment by means of a parallel connection directly to the mains, using an additional cable and a switch. For different reasons, however, none of these solutions are particularly attractive.

SUMMARY OF THE INVENTION

According to the present invention the control system comprises means for internally enabling such a coupling to the mains which is required for maintaining the voltage supply of the control system in case of an actuation subsequent to the said condenser being discharged to a subcritical level. Hereby the user will not have to carry out any special actuation acts, if the equipment has been out of use for a long time, as the required control voltage will be at disposal anyway.

For the practical arrangement, two different types of main principles will be disclosed. Thus, claim 2 specifies a system, which is in constant connection with the mains, but noticeably through a voltage and current limiting unit which, in practice, still provides for the desired off-mains condition in the user area, but nevertheless is operative to respond to a new attempt of switching on an operation unit of the installation system in producing a single actuation of the main switching unit, which will then result in a renewed charging of the operation condenser. Thereafter the latter may be operative for weeks, but the voltage maintained on the auxiliary condenser will ensure that the system may be actuated also after the operation condenser having been discharged to below the critical level for actuation of the control system.

The operation condenser acts as a voltage supply for a control circuit which, with suitable time intervals, actuates the main switching unit briefly, just sufficiently to ensure that the operation condenser is recharged, such that the latter will never get discharged to a point where it cannot fulfil this supply function, as long as the system is connected with the mains in the first place. The intermittent operation of the control circuit may be based on a clock generator which, with a high degree of safety, will effect a recharging of the operation condenser before it can possibly be subcritically discharged, or on a current measurement of the condenser voltage, such that an actuation of the main switching unit can be effected whenever the need arises for a recharging of the condenser, for example through relatively few minutes every several days, all according to the self discharging of the condenser.

This leads to considerations of such installations which are provided with a superior off-mains switching system mounted e.g. in a meter cabinet. In that kind of systems there will be no usable control or charging voltage available during the passive periods, and for that reason it is particularly important that the system of the invention according to claim 3 may provoke a periodic actuation of the main switching unit, such that the superior system may thereby detect a current consumption that is sufficient to cause a coupling in of the mains, whereby in the next stage a recharging of the operation condenser can be effected briefly, i.e. at short duration unless an operation unit in the relevant sub system is actuated so as to condition a longer lasting actuation of the main switching unit and thus an associated actuation of the superior coupling unit.

Thus, the system according to the invention may be operative during relatively long periods of time, measured in days or weeks, without any kind of external voltage supply, and the system will automatically organize the recharging required between these periods.

By the initial start of the system, the same should be made operative by the required energy charging. In principle it is possible—and known—to do this by connecting a battery, but according to the invention, confer claim 6, this may be avoided by the use of a detector for initial connection with the mains. The same detector may then also be active in such cases where the mains have been superiority disconnected through such a long period that the control equipment has lost its energy charge.

The invention has been developed in connection with an actuator equipment having DC motors and specific control buttons, whereby there is used a connection to the mains through a transformer and rectifier system. Loads of that type are not well suited as a basis of a detection of required energy by the switching on of a motor, but on the other hand the control buttons may be used directly as actuator buttons for the control system. However, it will be within the scope of the invention to use for this purpose a load detector, just as in the said superior off-mains switching systems, such that the system according to the invention is-not limited for use in connection with any particular types of operation units.

BRIEF DESCRIPTION OF THE DRAWINGS

In the following the invention is described in more detail with reference to the drawing, in which.

DESCRIPTION OF THE INVENTION

Figure 1:
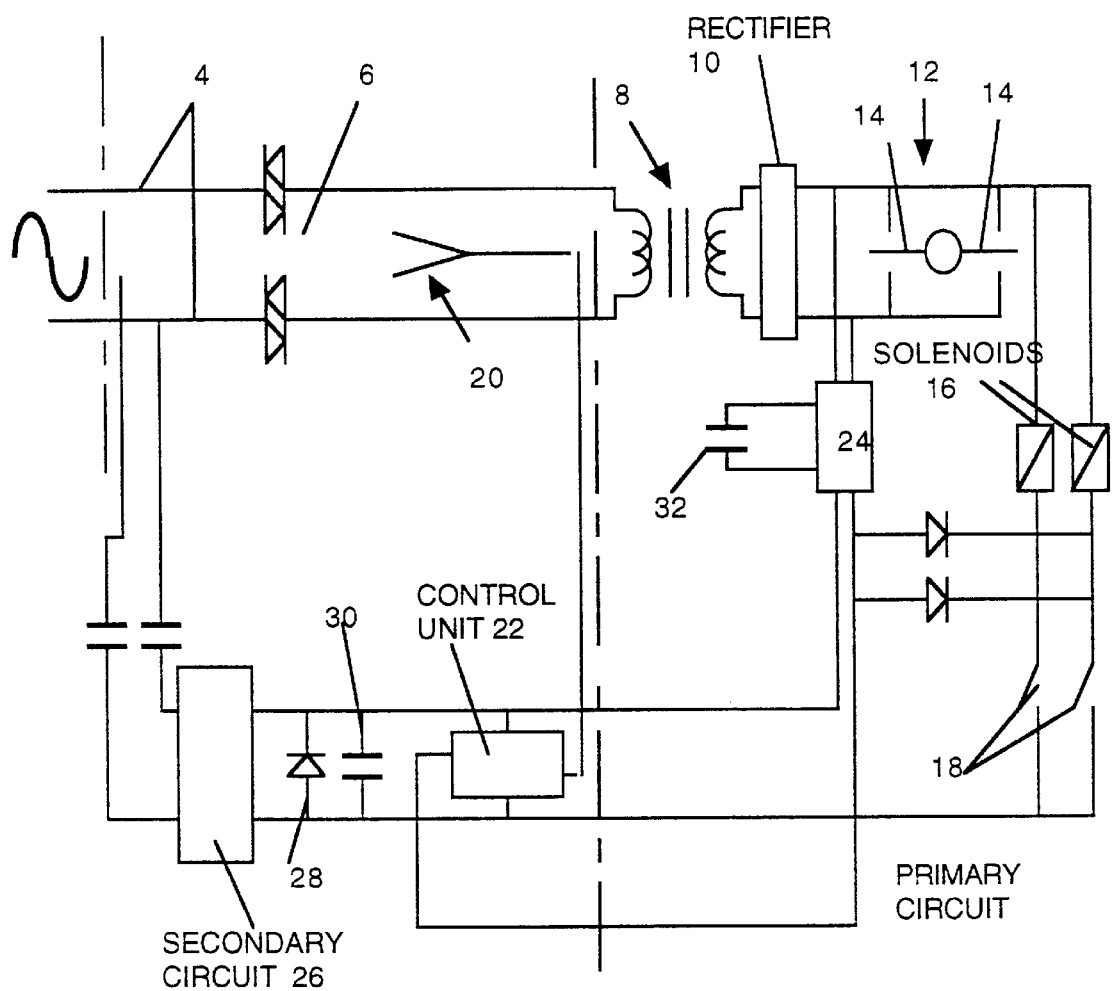
FIG. 1 is a schematic diagram of a system according to the invention.

In FIG. 1, numeral 2 denotes a connection to a single phase mains, which, itself, may be provided with an off-mains switching system. Associated wires 4 lead directly to a set of triacs 6 and therefrom further to an operation equipment with a transformer 8, a rectifier 10 and a load 12, which is illustrated as an actuator motor M operable to rotate one way or the other by means of relay switches 14 controlled by solenoids 16, which are actuated by respective operation switches 18, e.g. on a remote control unit.

The triacs 6 are controlled to close and open by means of a photo coupler 20 that is actuated from photo diodes in a control unit 22 energized partly from a primary circuit 24, which receives its voltage from the unit 10 and is coupled to the operation switches 18, and partly from a secondary circuit 26 that is coupled directly to the mains input 2 and includes a rectifier circuit, a voltage limiting diode 28 and an auxiliary condenser 30 diodes 25 are commonly connected at one end at a node between the control unit 22 and the primary circuit 24 and at the other ends separately to the solenoids 16 as shown.

Through the circuit 26,28 the current and voltage on the operation equipment is limited to a minimum, and consequently the auxiliary condenser 30 is charged relatively slowly. When it has been charged, perhaps after 10–20 seconds, the operation switches 18 can be used for actuation of the motor M, in that they actuate the circuit 22 to switch on the triacs 6 by means of energy from the auxiliary condenser 30, whereby the operational voltage on the equipment 12 is immediately supplied via the transformer 8, Hereby there will even be provided charging current for a large capacitor 32 in connection with the unit 24, and thereafter this capacitor will operatively take over the supply of the unit 22 by the following operations of the system.

The Zeener diode 28 may limit the voltage from the rectifier circuit 26 to e.g. 15 V, and the charging current on the auxiliary condenser may be e.g. 8 mA max. When the system is switched off-mains this condenser is rapidly discharged, and as mentioned it will be required, for restarting after a relatively long period of time so that also the capacitor 32 has been discharged, to reestablish the mains connection for initial recharging of the condenser 30, whereafter the equipment will again be operative.

The use of the photocoupler 22,20 is advantageous for obtaining an effective galvanic separation, but the invention is not limited to just that type of actuation connection.

Figure 2:
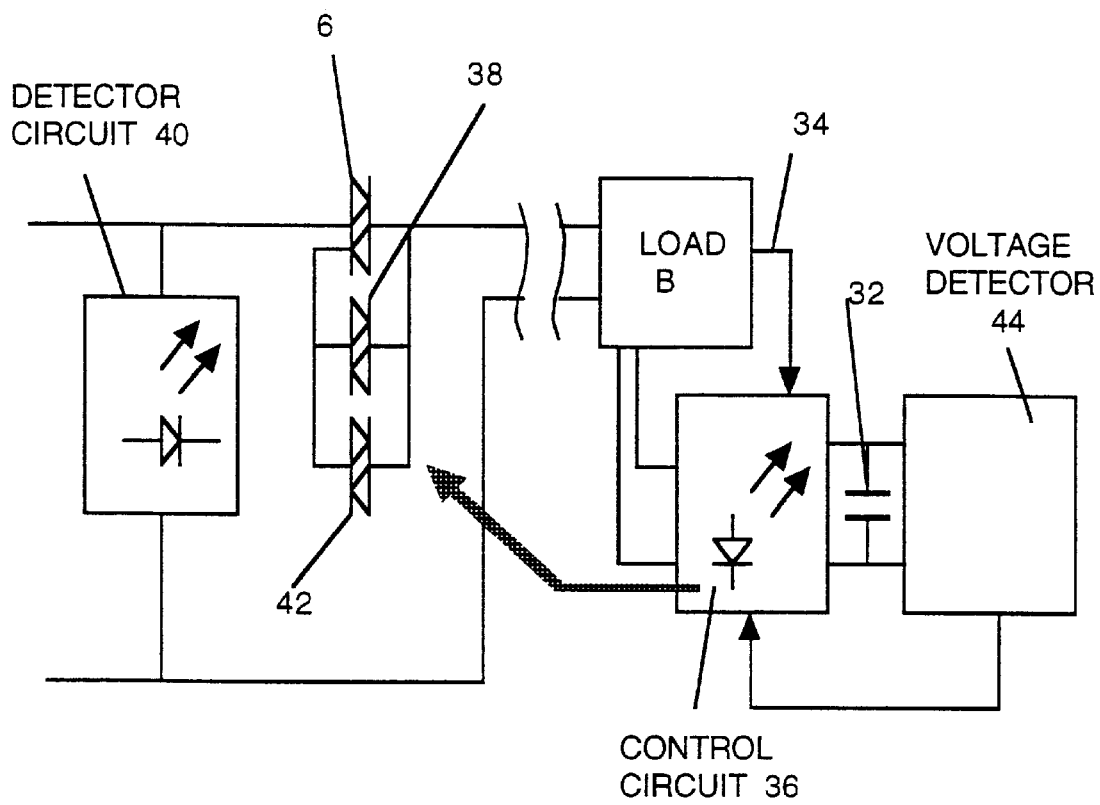
FIG. 2 is a corresponding diagram of a modified and preferred embodiment thereof.

In the system shown in FIG. 2 the load is shown schematically as a block B, which comprises a command or detector unit for signalling, through a control wire 34, a need for the mains to be switched on, the wire 34 leading to a control circuit 36 for producing a light signal to a photo coupler 38 actuating the triac 6, here provided in the phase wire only. Also i FIG. 2, the large operation capacitor is denoted 32. In front of the triac 6 a detector circuit 40 is provided, operable to detect the switching on of the mains or, respectively, the connection of the system to the mains in the first place, and to actuate the triac 6, preferably via a photo coupler, in response to such detection. It will be appreciated that in this system there will be only two electrical wire connections with the mains and that the capacitor 32 will automatically be initially recharged by the actuation of the detector 40. Moreover, it will be recharged by every switching on of the triac 6.

The control equipment comprises a voltage detector 44 for current detection of the voltage on the capacitor 32, which, also here, constitutes the voltage supply for the operative actuations of the triac 6 in response to start signals on the wire 34. The capacitor is charged to a level well above what is required for the actuation of the photo coupler 38, and the detector 44 is designed so as to produce a control signal to the trigger circuit 36 whenever the discharging has proceeded so far that the remaining charge, with the required safety margin, is sufficient for only one more such actuation. In its turn, this will condition a new and complete recharging, irrespective of the system being connected to the mains through a superior off-mains switching arrangement.

Alternatively, the unit 44 may be a timer, which, without detecting the capacitor charge, operates to actuate the trigger 36 at such short intervals that the capacitor will not normally reach a discharged condition, e.g. for five minutes every three days.

If a superior off-mains switch has been switched off for a long period of time it may be necessary, for reestablishing the control voltage on the capacitor, to switch on a load, e.g. a lamp in the system, or to switch off and then on of the relevant supply switch for actuation of the initial starter circuit.

It should be noted that the principles of the invention are not limited for use in connection with the ordinary heavy power system. Admittedly, it is in that area the voltage fields are undesired, but a similar off-mains arrangement will be relevant even for obtaining a saving of current consumption, e.g. in connection with transformers with no-load losses, confer FIG. 1. In a quite similar manner it will be possible to achieve an energy saving in relevant electronic devices, for example in a control signal detector such as an IR detector, having a receiver unit and an associated identification and control signal producing unit. The receiver unit should be constantly operative to respond to an arriving signal, but the other units may well be unenergized as long as no signals are received. Thus, it may be the signal reception itself which generates the trigger signal for a current supply to the other units, including even a supply transformer, and in the meantime the trigger voltage may be held ready in the manner here disclosed, all of course with relevant adaptations to the electronic environment, where the capacitor, then, is again usable for a steady voltage supply of the receiver unit. It will hardly be relevant to aim at a capacitor time of three weeks, but, for example, only of three hours with an associated brief recharging time. The system may well be so adapted that it can operate in connection with a superior off-mains switching arrangement, viz. with quite brief connections of a small load, sufficient to actuate a coupling in of the mains, optionally for few seconds only.

I claim:

1. An off-mains switching system for automatically switching off the mains to current consuming units in response to being switched off and for reestablishing operational voltage therefor in response to switching on of a unit, comprising control equipment for actuation of a voltage coupler in response to a unit becoming switched on and for interrupting the voltage supply as a result of a detected termination of a noticeable current consumption by such unit, said control equipment including an operation capacitor with relatively high capacity, to which a charging voltage is supplied as long as the mains are connected, and which, subsequently, operates as a voltage source for actuation of the control equipment in response to a restarting of a unit, wherein the control equipment comprises means for internally enabling a connection with the mains, said connection being sufficient for maintaining a voltage supply for the control equipment when the charge on the said capacitor drops below a critical level.

2. A system according to claim 1, comprising a current and voltage limiting unit for permanent connection with the mains the limiting unit comprising a relatively small auxiliary condenser, which is kept charged by said limiting unit, and a control circuit for actuating the mains voltage coupler by means of the voltage of the auxiliary condenser in response to a unit being switched on.

3. A system according to claim 1, wherein the operation capacitor is connected as a voltage supply for an intermittently operating actuation circuit for the mains voltage coupler in such a manner that said voltage coupler in the absence of an actuation of an operation unit, is briefly actuated for recharging the operation capacitor with time intervals sufficiently short to ensure that the said capacitor will steadily be charged sufficiently for its activating of the actuation circuit.

4. A system according to claim 3, in which the actuation circuit comprises a timer for activating the mains voltage coupler at regular intervals.

5. A system according to claim 3, in which the actuation circuit is connected with a measuring circuit and is responsive to the voltage of the operation for activating the mains voltage coupler for recharging of the operation capacitor whenever the voltage thereof has dropped to a predetermined level, at which the operation capacitor is able to operate the actuation circuit.

6. A system according to claim 1, in which the control equipment comprises means for detecting the effective connection of the equipment to the mains and, in response to such a detection, to actuate the mains voltage coupler for a period of time, sufficient to effect recharging of the operation capacitor.

7. A system according to claim 1, further including an electronic signal receiver responsive to an incoming signal for detecting said signal and actuating an external voltage supply, in response to the detection said incoming signal.

8. An off-mains switching system for automatically switching off the mains to a current consuming unit in response to such unit being switched off and for reestablishing an operational voltage therefor in response to such unit being switched on, comprising:

a control circuit;

a voltage coupler between the mains and the unit being responsive to the control circuit for connecting and interrupting the mains respectively, depending upon the unit becoming switched on and a termination of current consumption by the unit, said control circuit including an operation capacitor with a relatively high capacity coupled to the voltage coupler for receiving a charging voltage as long as the mains are connected, and coupled to the control circuit for acting as a voltage source for actuation thereof in response to a restarting of the unit; and means for internally establishing connection of the operation capacitor with the mains for maintaining a voltage supply for the control circuit when said capacitor drops below a selected level whereby the voltage supply to the control circuit is maintained at a level sufficient to operate the control circuit.

* * * * *

UNITED STATES PATENT AND TRADEMARK OFFICE
CERTIFICATE OF CORRECTION

PATENT NO. : 5,939,803
DATED : August 17, 1998
INVENTOR(S) : John Frost

Figure 1A:
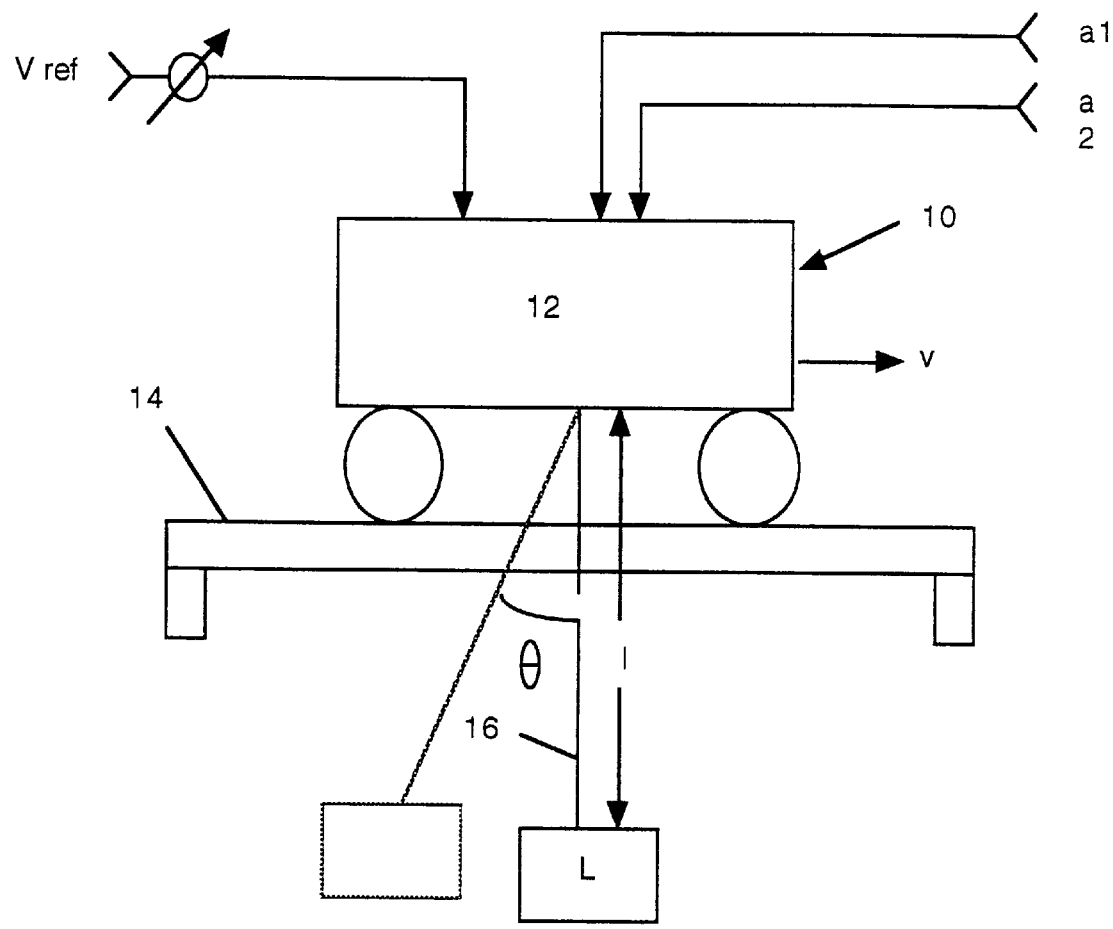

It is certified that error appears in the above-identified patent and that said Letters Patent is hereby corrected as shown below:

Drawings,
Delete "FIG. 1A".

Signed and Sealed this

Thirtieth Day of September, 2003

JAMES E. ROGAN
*Director of the United States Patent and Trademark Office*